United States Patent [19]

Kremheller et al.

[11] 4,330,268

[45] May 18, 1982

[54] ROLLER HEARTH FURNACE FOR CERAMIC MATERIAL

[75] Inventors: Hermann Kremheller; Michael Ciesla, both of Nuremburg, Fed. Rep. of Germany

[73] Assignee: Ludwig Riedhammer GmbH & Co. KG, Nuremburg

[21] Appl. No.: 235,411

[22] Filed: Feb. 17, 1981

[30] Foreign Application Priority Data

Feb. 19, 1980 [DE] Fed. Rep. of Germany ....... 3006114

[51] Int. Cl.[3] .......................... F27D 3/00; F16D 3/14; B65G 13/06

[52] U.S. Cl. .................................... 432/246; 198/791; 464/182

[58] Field of Search ................ 432/239, 246; 198/791; 64/30 E, 27 R, 27 F

[56] References Cited

U.S. PATENT DOCUMENTS

| | | | |
|---|---|---|---|
| 445,293 | 1/1891 | Treat | 198/791 |
| 3,489,397 | 1/1970 | Alexander | 432/246 |
| 4,215,775 | 8/1980 | Gebhardt | 198/791 |

*Primary Examiner*—John J. Camby
*Attorney, Agent, or Firm*—Spencer & Kaye

[57] ABSTRACT

A system for conveying ceramic workpieces through a roller hearth furnace, composed of: a plurality of conveying rollers rotatably mounted one behind the other in the workpiece conveying direction with their axes of rotation parallel to one another and perpendicular to the conveying direction, and defining a common support plane for the workpieces; a plurality of drive gears each associated, and mounted coaxially, with a respective roller and provided with an axial bore having a diameter larger than that of its respective roller, with one axial end of each roller extending into the bore of its associated drive gear and being disconnectably but securely connected to its associated drive gear; and a plurality of transmission gears each mounted for rotation about an axis parallel to the axes of rotation of the rollers and each engaging an associated pair of adjacent drive gears to form a gear train in which the drive gears alternate with the transmission gears and the application of power to the gear train causes all of the drive gears to rotate in the same sense and to rotate the rollers in synchronism.

16 Claims, 2 Drawing Figures

ROLLER HEARTH FURNACE FOR CERAMIC MATERIAL

BACKGROUND OF THE INVENTION

The present invention relates to a roller hearth furnace, or kiln, for firing ceramic material.

The requirements to be met by the roller drive of such a furnace, and the design of a roller drive meeting such requirements, are described in an article by E. Wolf et al at pages 66–68 of the technical periodical entitled SPRECHSAAL, No. 1/1980. According to that article, to prevent bending or warping of the ceramic material, which is plastic in the high temperature range employed, as well as to broaden the range of formats, or shapes, to be handled by the furnace, the axial spacing between the rollers should be as small as possible.

But this requirement is, in a way, contrary to the requirement of keeping the free cross section between the rollers large so as to assure temperature equalization and good exposure of the material to be fired to the furnace gases. These mutually contradictory requirements result in the tendency of using rollers with as small a diameter as possible. This solution, however, has its limits because of the requirement for sufficient strength of the rollers at the high temperatures encountered.

The rollers employed are made of metal or ceramic materials and have diameters of approximately between 25 and 50 mm.

The above-cited article further presents reasons why persons skilled in the art do not drive a plurality of the rollers in such a furnace by means of a single rotating chain drive. The main reason for this is the requirement for a rotary movement which is as uniform and smooth as possible. Moreover, such a chain drive increases the difficulty of replacement of rollers; something that is frequently necessary in such furnaces and that must be feasible without interruption of furnace operation. Such replacement of rollers becomes necessary if rollers break, which occurs more frequently when rollers of ceramic material are used. Replacement of rollers may also become necessary, for example, because glazing material adheres to the roller surface, which leads to irregularities on the roller surface and to resulting reductions in the quality of the fired material.

The rollers of the individual longitudinal sections of the prior art roller hearth furnace are driven by a common shaft which extends in the longitudinal direction of the furnace. The synchronous transmission of torque from the common shaft to the individual rollers is effected by pairs of helical gear wheels, which have the know characteristic of operating smoothly because of their gradual engagement.

Such a drive for the rollers is structurally complicated. The encapsulation of such a drive requires a considerable amount of space. The rollers can be replaced only from the side of the roller hearth furnace opposite the drive shaft side if, with the customary encapsulated design of the drive assembly, the drive assembly box is not to be opened. When rollers break, the broken end on the driven side cannot be removed in a simple manner. Since the rollers are driven by means of helical gear wheels, axial thrusts are continuously transmitted from the drive shaft to the individual rollers which, in order to be absorbed in the associated bearings, requires increased expenditures for the bearings.

SUMMARY OF THE INVENTION

It is an object of the present invention to provide a roller hearth furnace of the above-mentioned type having an inexpensive drive assembly and in which it is possible to easily replace the rollers from either side of the furnace.

The above and other objects are achieved, according to the invention by the provision of a conveyor system for conveying ceramic workpieces through a roller hearth furnace, which system is composed of:

a plurality of conveying rollers rotatably mounted one behind the other in the workpiece conveying direction with their axes of rotation parallel to one another and perpendicular to the conveying direction, and defining a common support plane for the workpieces;

a plurality of drive gears each associated, and mounted coaxially, with a respective roller and provided with an axial bore having a diameter larger than that of the respective roller, with one axial end of each roller extending into the bore of its associated drive gear;

means establishing a disconnectable rotationally secure connection between each gear and its associated roller; and a plurality of transmission gears each mounted for rotation about an axis parallel to the axes of rotation of the rollers and each engaging in an associated pair of adjacent drive gears to form a gear train in which the drive gears alternate with the transmission gears so that force transmission between adjacent drive gears takes place through associated transmission gears and the application of power to the gear train causes all of the drive gears to rotate in the same sense and to rotate the rollers in synchronism.

According to the present invention, the drive force for the rollers is propagated from roller to roller via the transmission gears. Replacement of a roller does not require interruption of the torque transmission from the motor to all connected drive gears. Due to the presence of an annular gap between each roller and the inner wall of the passage bore of its associated drive gear, it is possible to easily pull the roller to be replaced through the bore in its drive gear even if impurities have been deposited on the roller surface such impurities being stripped off or scraped off, respectively, on the entrance side of the passage opening when the roller is pulled out.

The requirement that the diameter of the bore of the drive gear be greater than the roller diameter should be satisfied, according to the concept on which the present invention is based and in order to assure the goal of easy replaceability of the rollers, at least with respect to that region of the roller which is intended to support material to be fired, or which lies on the furnace side of the drive system, outside of the region enclosed by the bore of the drive gear. For a rotationally secured torque transmission between the drive gear and the roller, any desired known means can be employed to bridge the above-mentioned annular gap between the bore in the drive gear and the outer diameter of the roller, e.g. a radial clamping ring pressed into such annual gap, such as those commercially available for example under the designation "Star Tolerance Ring" as a general machine part, sold by Roller Bearing Company of America, Sullivan Way, West Trenton, N.Y. 08628, patented in USA under the U.S. Pat. No. 3,061,386.

According to preferred embodiments of the invention, the one axial end of each roller extends through the bore of its associated drive gear, and the means establishing a connection include a plurality of fastening sleeves each mounted on the one axial end of a respective roller in a manner to be secure against rotation relative thereto. This facilitates handling of the free roller end, and this simplifies the replacement of rollers without any problems.

Preferably, each sleeve additionally engages the drive gear associated with its respective roller in a manner to be secured against rotation relative thereto. This permits the torque transmission between the roller and the drive gear to occur via the sleeve and thus on the side of the drive assembly facing away from the furnace, substantially outside of the range of influence of the furnace heat, so that the desired easy replaceability of the rollers is enhanced. This purpose can be aided by providing the sleeve with an annular flange and providing each drive gear with an axially extending collar via which the drive gear is engaged by its associated sleeve flange, because, when the roller to be replaced is pulled out, the separation of torque between the drive gear and the roller is effected in the region of the annular flange of the sleeve. Once the roller has been pulled out, the sleeve can be removed from the roller outside of the furnace.

Each sleeve can be in the form of a cap which essentially encloses the one axial end of its respective roller. This is particularly advisable when ceramic rollers are used so as to protect mechanically the end of the roller projecting out of the drive assembly.

In order to facilitate attachment of removing tools to the roller, each sleeve can be provided with at least one radially extending projection, particularly in the form of an annular collar.

By constructing the torque transmission structure between the individual parts of the roller drive so that, for each drive gear and its associated roller, the means establishing a connection define a pair of coaxial, cylindrical faces spaced apart to form an annular gap, with one of the faces being formed on one of the drive gear and roller, and those means include a radial clamping ring inserted into the gap to establish a rotationally secure connection between the faces, it is possible to additionally fix the rollers in their axial direction, particularly since, when the gears are constructed as spur gears with linear, axially extending teeth, no axial thrust acts on the rollers.

According to a preferred embodiment of the above-described arrangement, each sleeve and its associated drive gear present respective coaxial, cylindrical faces spaced apart to form a first annular gap, each sleeve and its associated roller present respective coaxial, cylindrical faces spaced apart to form a second annular gap, and there are further provided two radial clamping rings, each inserted into a respective annular gap to establish a rotationally secure connection between the faces of its associated gap, the securing force exerted by the ring in the first gap being less than that exerted by the ring in the second gap assures that the torque connection between the sleeve and the drive gear is always released first when axial removal forces are effective so that with further pulling the roller is pulled out of the furnace. These different dimensions of the respective tensions in the radial clamping rings are effected in a simple manner by giving the appropriate tolerances to the annular gaps between the parts paired for torque transmission.

Preferably, that surface of the clamping ring in the second gap which faces the roller is cylindrical ground. This is advantageous when the rollers are ceramic rollers which are extrusion molded to have the same diameter over their entire length and which are then fired. However, this manufacturing process does not assure 100 percent roundness, which is a prerequisite for any type of roller. Moreover, the cyindrical grinding produces an axial collar which, when there is direct torque transmission between roller and drive gear by means of a radial clamping ring, carries the clamping ring along when the roller is pulled out of the drive gear.

When the system includes a gear box including side walls supporting the gear bearings, such gear box can be made very small, due to the gear design according to the invention, and thus requires low structural expenditures.

DESCRIPTION OF THE PREFERRED EMBODIMENTS

Figure 1:
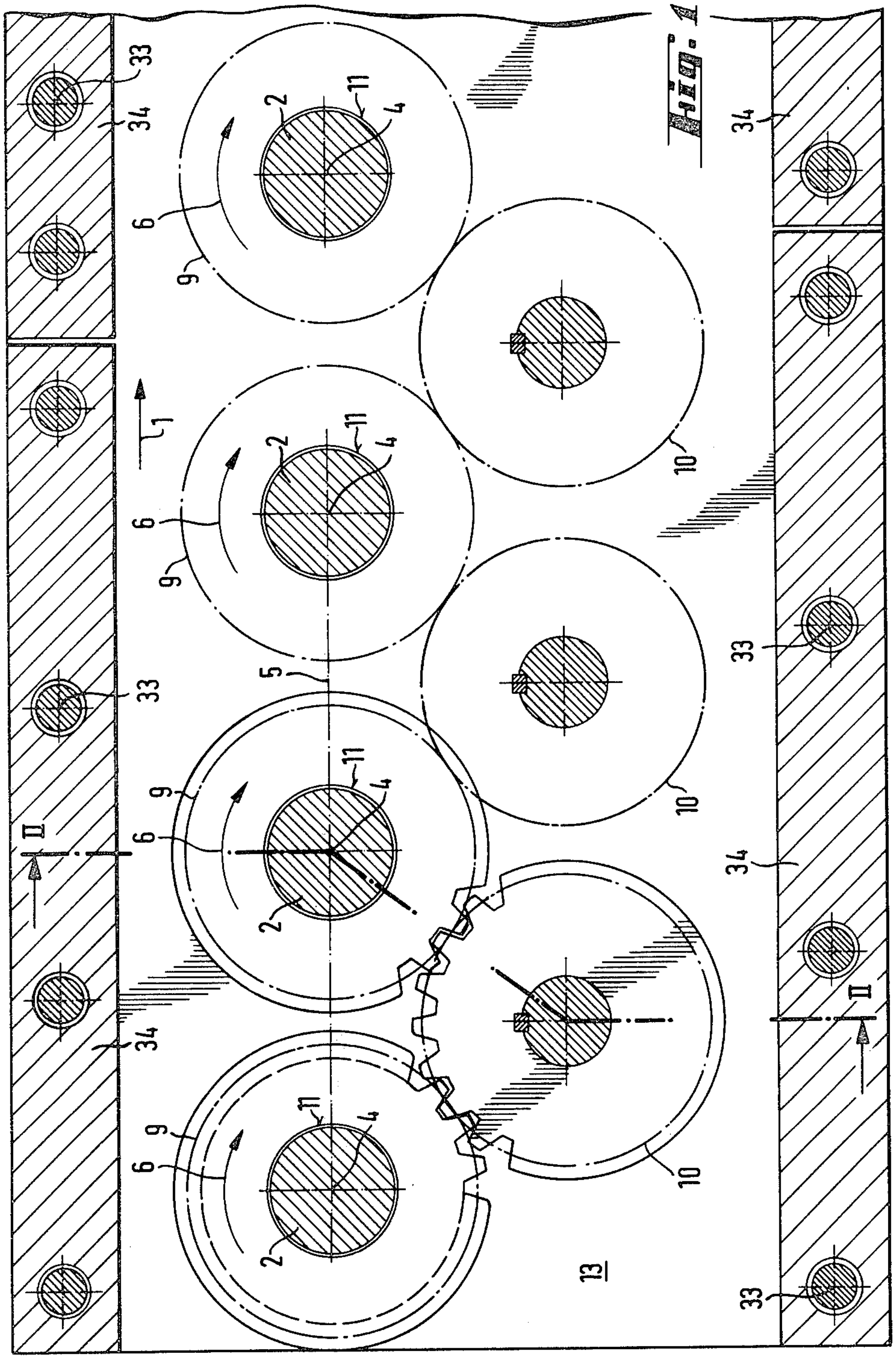
FIG. 1 is a schematic side elevational view of a preferred embodiment of a drive assembly for a roller hearth furnace according to the invention.
Figure 2:
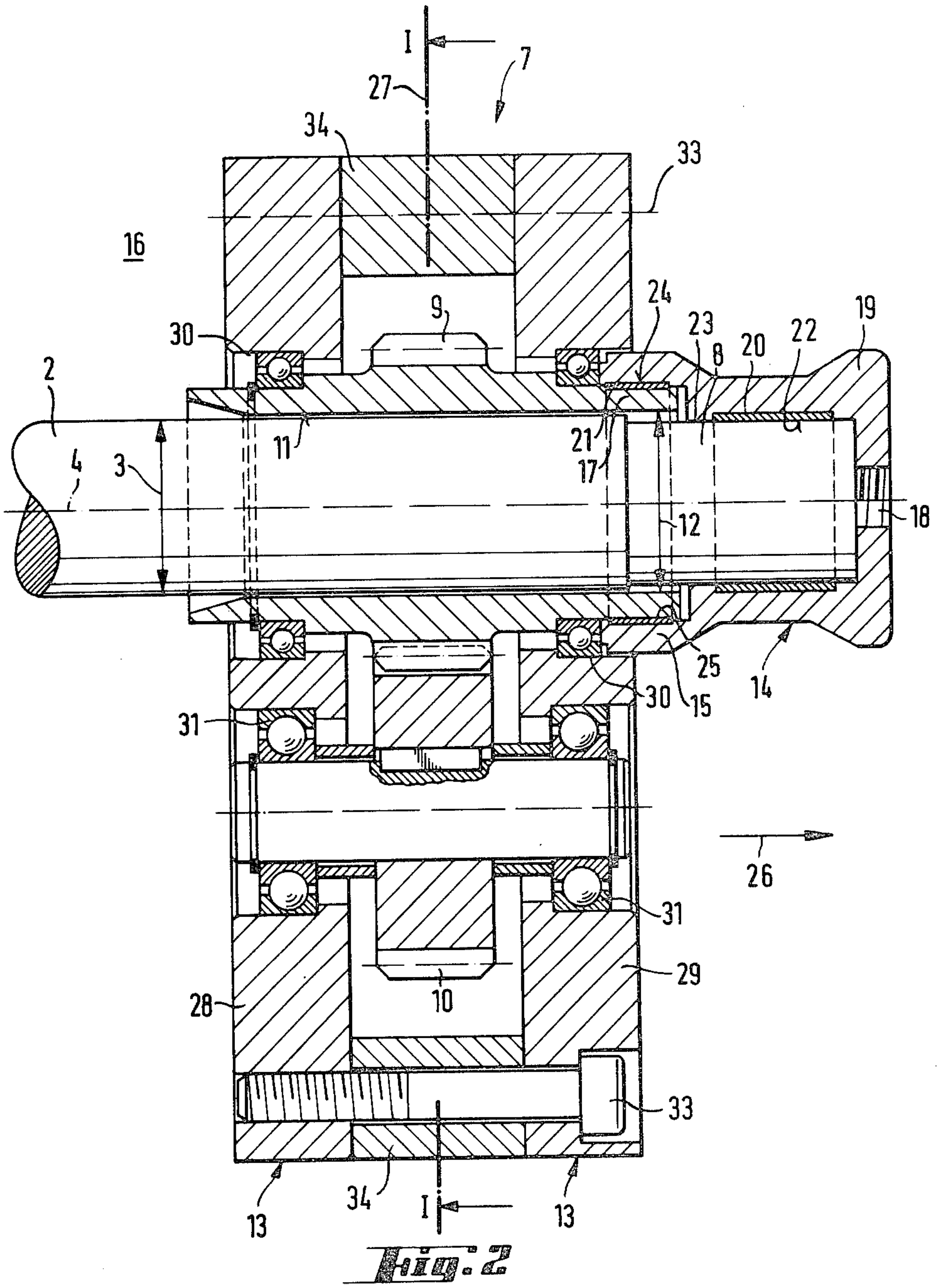
FIG. 2 is a cross-sectional view along the line II—II of FIG. 1.

A plurality of rollers 2, one of which is shown in FIG. 2, of metallic or ceramic material are arranged one behind the other in the direction of passage of ceramic material through a furnace 1 to support and convey such material through the furnace 1. All of the rollers 2 have the same diameter 3. They are driven in synchronism and rotate in the same direction as shown by the arrows 6 in FIG. 1. At their end 7 directed toward the gears, each roller 2 is in rotationally secured connection with a respective drive gear 9 which is mounted coaxially with the associated roller axis 4. Each adjacent pair of driving gears 9 engages a free wheeling transmission gear 10 which is mounted for rotation about an axis parallel to the roller and drive gear axes. In this way, a plurality of drive gears 9—many more than shown in FIG. 1—and transmission gears 10 form a drive train which, when a drive motor (not shown) generates a torque, causes all of the rollers 2 of the drive train to rotate in the same direction and at the same speed.

In the direction of its axis 4, each drive gear 9 is provided with a passage bore 11 for its respective associated roller 2. The diameter 12 of the bore is greater than the diameter 3 of the roller.

The roller 2 passes through the drive gear 9 and projects at its axial end 8 beyond the drive gear 9 or beyond the gear box 13, respectively. A sleeve 14 is placed onto the end 8 of the roller so as to be secure against rotation relative thereto. At its end facing the furnace 16, the sleeve 14 is provided with an annular flange 15 through which it is similarly in rotationally secured engagement with the drive gear 9. The annular flange 15 of the sleeve 14 encloses a collar 17 of the drive gear 9. Between the annular flange 15 and the collar 17 there occurs the transmission of torque between gear 9 and its associated roller 2.

In the illustrated embodiment, the sleeve 14 is provided as a cap which essentially surrounds the roller end 8 and is provided at its axial end with a passage opening 18 for engagement of the pressure pin of a removal tool. On its exterior, the sleeve 14 is further provided with radial projections, particularly an annular collar 19, likewise for the engagement of a removal tool.

In the illustrated embodiment the torque transmission between gear 9 and roller 2 does not occur directly via sleeve 14 but by means of radial clamping rings 20 and 21, which can also be provided if there is direct transmission of torque. The radial clamping ring 20 is effective between the shaft end 8 and the sleeve 14. It lies in the annular gap between the cylindrical faces which lie inside one another, i.e. between the inner cylinder face 22 of the sleeve 14 and the outer cylinder face 23 of the roller end 8. In the same manner, the radial clamping ring 21 lies under radial tension in the annular gap between the nested sleeve 14 and drive gear 9 which are paired for the transmission of torque, i.e. between the inner cylinder face 24 of the annular flange 15 and the outer cylinder face 25 of the collar 17 of the drive gear 9.

The radial tension of the radial clamping ring 21 is less than that of the radial clamping ring 20 so that when the sleeve 14 is removed in the removal direction 26, first the torque transmitting connection between sleeve 14 and drive gear 9 is released and with further removal of the sleeve 14, the roller 2 is pulled through the passage bore 11 of the drive gear 9 and completely out of the furnace and out of the gear box 13.

The drive gears 9 and the transmission gears 10 are preferably linearly toothed spur gears.

The cylindrical seat of the clamping ring 20 on the outer cylinder face 23 of the roller end 8 is ground cylindrically, in any case if the roller 2 is a ceramic roller.

The drive gears 9 and the transmission gears 10 are mounted in the side walls 28 and 29 of the gear box 13 by means of bearings 30 and 31 located to both sides of their meshing range centered on the vertical plane 27.

It will be understood that the above description of the present invention is susceptible to various modifications, changes and adaptations, and the same are intended to be comprehended within the meaning and range of equivalents of the appended claims.

The side walls 28 and 29 are connected by screws 33 and distance pieces 34 and form in this way the gear box 13.

What is claimed is:

1. A system for conveying ceramic workpieces through a roller hearth furnace, comprising:

- a plurality of conveying rollers rotatably mounted one behind the other in the workpiece conveying direction with their axes of rotation parallel to one another and perpendicular to the conveying direction, and defining a common support plane for the workpieces;
- a plurality of drive gears each associated, and mounted coaxially, with a respective roller and provided with an axial bore having a diameter larger than that of said respective roller, with one axial end of each said roller extending into said bore of its associated drive gear;
- means establishing a disconnectable rotationally secure connection between each said gear and its associated roller; and
- a plurality of transmission gears each mounted for rotation about an axis parallel to the axes of rotation of said rollers and each engaging in an associated pair of adjacent drive gears to form a gear train in which said drive gears alternate with said transmission gears so that force transmission between adjacent drive gears takes place through associated transmission gears and the application of power to said gear train causes all of said drive gears to rotate in the same sense and to rotate said rollers in synchronism.

2. An arrangement as defined in claim 1 wherein said one axial end of each said roller extends through said bore of its associated drive gear, and said means establishing a connection comprise a plurality of fastening sleeves each mounted on said one axial end of a respective roller in a manner to be secure against rotation relative thereto.

3. An arrangement as defined in claim 2 wherein each said sleeve additionally engages said drive gear associated with its respective roller in a manner to be secured against rotation relative thereto.

4. An arrangement as defined in claim 3 wherein each said sleeve is provided with an annular flange via which said sleeve engages said associated drive gear.

5. An arrangement as defined in claim 4 wherein each said drive gear comprises an axially extending collar via which said drive gear is engaged by its associated sleeve.

6. An arrangement as defined in claim 2, 3, 4 or 5 wherein each said sleeve is in the form of a cap which essentially encloses said one axial end of its respective roller.

7. An arrangement as defined in claim 2, 3 or 4 wherein each said sleeve is provided with at least one radially extending projection.

8. An arrangement as defined in claim 7 wherein said projection on each said sleeve is in the form of an annular collar.

9. An arrangement as defined in claim 3 wherein each said sleeve and its associated drive gear present respective coaxial, cylindrical faces spaced apart to form a first annular gap, each said sleeve and its associated roller present respective coaxial, cylindrical faces spaced apart to form a second annular gap, and said means establishing a connection further comprise, for each said sleeve, two radial clamping rings, each inserted into a respective annular gap to establish a rotationally secure connection between said faces of its associated gap, the securing force exerted by said ring in said first gap being less than that exerted by said ring in said second gap.

10. An arrangement as defined in claim 9 wherein that surface of said ring in said second gap which faces said roller is cylindrically ground.

11. An arrangement as defined in claim 1 wherein, for each said drive gear and its associated roller, said means establishing a connection define a pair of coaxial, cylindrical faces spaced apart to form an annular gap, with one of said faces being formed on one of said drive gear and roller, and said means comprise a radial clamping ring inserted into said gap to establish a rotationally secure connection between said faces.

12. An arrangement as defined in claim 11 wherein said one face is formed on said roller and that surface of said ring which faces said roller is cylindrically ground.

13. An arrangement as defined in claim 1 wherein each said gear is a spur gear having axially extending, linear teeth.

14. An arrangement as defined in claim 1 wherein said drive gears mesh with said transmission gears over a region centered on a vertical plane and further comprising bearings supporting said gears at both sides of their meshing region.

15. An arrangement as defined in claim 14 further comprising a gear box having side walls supporting said bearings.

16. An arrangement as defined in claim 1 wherein all of said gears have equal diameters.

* * * * *